US007431101B2

(12) United States Patent
Hacker

(10) Patent No.: US 7,431,101 B2
(45) Date of Patent: Oct. 7, 2008

(54) LOAD SENSING HYDRAULIC SYSTEM

(75) Inventor: Richard Hacker, Quebec (CA)

(73) Assignee: Mecanique R. H., Quebec (CA)

( * ) Notice: Subject to any disclaimer, the term of this patent is extended or adjusted under 35 U.S.C. 154(b) by 105 days.

(21) Appl. No.: 11/611,535

(22) Filed: Dec. 15, 2006

(65) Prior Publication Data

US 2007/0151237 A1 Jul. 5, 2007

(30) Foreign Application Priority Data

Dec. 16, 2005 (CA) .................................... 2530727

(51) Int. Cl.

| | |
|---|---|
| ***A01B 41/06*** | (2006.01) |
| ***G06F 7/70*** | (2006.01) |
| ***G06F 19/00*** | (2006.01) |
| ***G06G 7/00*** | (2006.01) |
| ***G06G 7/76*** | (2006.01) |

(52) U.S. Cl. ............................................ 172/2; 701/50

(58) Field of Classification Search ............... 172/2–12; 701/50

See application file for complete search history.

(56) References Cited

U.S. PATENT DOCUMENTS 7,025,148 B2 * 4/2006 Hansen .......................... 172/2

* cited by examiner

*Primary Examiner*—Christopher J. Novosad
(74) *Attorney, Agent, or Firm*—Baker Botts L.L.P.

(57) ABSTRACT

A versatile load sensing hydraulic system capable of being adapted to a variety of possible configurations for vehicle mounted implements such as plow/spreader type vehicles or the like is disclosed. An embodiment of the hydraulic system comprises a reservoir for hydraulic fluid; a load sensitive variable displacement pump for pumping hydraulic fluid from the reservoir; and a plow on/off valve having a pressure port coupled to the pump for receiving hydraulic fluid under pressure. The plow valve includes a manifold having a fluid channel coupled to the plow valve pressure port and further having a number of return ports; one or more on/off valve coupled to the manifold return ports, each valve being adapted to control fluid flow therein to operate a respective component of the plow equipment; and a stroke valve coupled to a manifold return port, the stroke valve being adapted to operate in conjunction with one or more of the on/off valve for providing a load sensing pressure signal to the pump.

30 Claims, 5 Drawing Sheets

LOAD SENSING HYDRAULIC SYSTEM

This application claims priority from co-pending Canadian patent application No. 2,530,727 entitled "Load Sensing Hydraulic System for Plow/Spreader Vehicles" filed Dec. 16, 2005.

FIELD OF THE INVENTION

The invention relates generally to a versatile load sensing hydraulic system capable of being adapted to a variety of possible configurations for vehicle mounted implements such as plow/spreader type vehicles or the like.

BACKGROUND OF THE INVENTION

The operation of vehicles such as those used for plowing or scraping snow and/or ice from roads, airport runways and similar surfaces and for spreading traction enhancing materials such as sand and/or salt requires the installation of a hydraulic system that supplies power to operate the various components of spreader and plow equipment. The usual installation includes a single gear pump that pushes hydraulic fluid through an open center valve with a power beyond connection, which is used to operate the plow functions. The power beyond is connected to the pressure of the spreader valve, from where it returns to a hydraulic fluid tank or reservoir, or is partially routed to the spreader's hydraulic motors. The principal problem of this circuit is the stoppage of the spreader when any plow function is operated. Various solutions have been used to remedy this problem.

Tandem pumps may be used in two completely separate hydraulic circuits. One pump supplies the plow hydraulic functions, the other one supplies the spreader only. Simultaneous operation is rendered possible for both the plow and the spreader, but several major inconveniences remain. The system is more expensive, more complicated, requires a larger hydraulic fluid reservoir and consumes more energy.

Another solution is the use of a variable displacement piston pump that is usually controlled by sensing the load. The load sensing pump works in conjunction with closed center valves that share a common pressure supply, which is the pump. This constitutes a normal load sensing circuit, with all its usual benefits. The main problem associated with this solution is the very high cost of load sensing valves and pumps.

Therefore, there is a need for a cost effective load sensing hydraulic system capable of providing hydraulic fluid to operate the various components of plow/spreader type equipment.

SUMMARY OF INVENTION

This invention is directed to a hydraulic system for operating vehicle mounted hydraulic equipment such as that mounted on plow/spreader or sander type equipment. Other hydraulically operated accessories may likewise be operated from this system, such as sweepers, wetting systems and any kind of other equipment requiring hydraulic flow. In one aspect, the hydraulic system comprises a reservoir for hydraulic fluid, a flow and pressure compensated variable displacement pump, referred to commonly as a load sensing pump, for pumping hydraulic fluid from the reservoir and a plow on/off valve apparatus having a pressure port coupled to the pump for receiving hydraulic fluid under pressure. The plow valve apparatus comprises a manifold having a fluid channel with a pressure port and a number of return ports. Further the plow valve apparatus further includes one or more on/off valves coupled to the manifold return ports, each valve being adapted to control fluid flow therein to operate a respective component of the plow equipment, and a stroke valve coupled to a manifold return port, the stroke valve being adapted to operate in conjunction with one or more of the on/off valves for providing a load sensing pressure signal to the pump.

Further, the hydraulic system in accordance with one embodiment of the present invention may comprise a load sensing spreader valve having a pressure port coupled to the pump for receiving hydraulic fluid under pressure. The spreader valve comprises a device for controlling fluid flow through the spreader valve for operating the spreader and a port for providing a load sensing pressure signal. The hydraulic system further includes a shuttle valve arrangement for receiving the load sensing pressure signal from the spreader valve and the load sensing pressure signal from the plow on/off valve apparatus, and for applying a resultant load sensing pressure signal to the pump.

In addition, the hydraulic system may comprise a plow load sensing valve apparatus having a pressure port coupled to the pump for receiving hydraulic fluid under pressure. The plow load sensing valve apparatus comprises one or more load sensing valves adapted to control fluid flow therein to operate components of the plow equipment, and a port for providing a load sensing pressure signal from the plow load sensing valves.

One aspect of the present invention provides for a hydraulic system for operating hydraulic functions of plow/spreader type equipment comprising:

a) a reservoir means for hydraulic fluid;
b) a load sensitive variable displacement pump means for pumping hydraulic fluid from the reservoir; and
c) a plow on/off valve means having a pressure port coupled to the pump means for receiving hydraulic fluid under pressure, the plow valve means including:
   i) a manifold means having a fluid channel coupled to the plow valve means pressure port and further having a number of return ports;
   ii) one or more on/off valve means coupled to the manifold means return ports, each valve means being adapted to control fluid flow therein to operate a respective component of the plow equipment; and
   iii) a stroke valve means coupled to a manifold means return port, the stroke valve means being adapted to operate in conjunction with one or more of the on/off valve means for providing a load sensing pressure signal to the pump means.

Another aspect of the present invention provides for a hydraulic system for controlling hydraulic functions comprising:

a) a reservoir means for hydraulic fluid;
b) a load sensing variable displacement pump means for pumping hydraulic fluid from the reservoir;
c) a unitised valve block having a pressure port coupled to the pump means, the unitised valve block comprising at least one hydraulic function valve means for controlling at least one hydraulic function; and
d) a stroke valve means for providing a load sensing pressure signal to the pump means, the stroke valve being operated based on the operation of each function valve means.

Other aspects and advantages of the invention, as well as the structure and operation of various embodiments of the invention, will become apparent to those ordinarily skilled in the art upon review of the following description of the invention in conjunction with the accompanying drawings.

DETAILED DESCRIPTION

Figure 1:
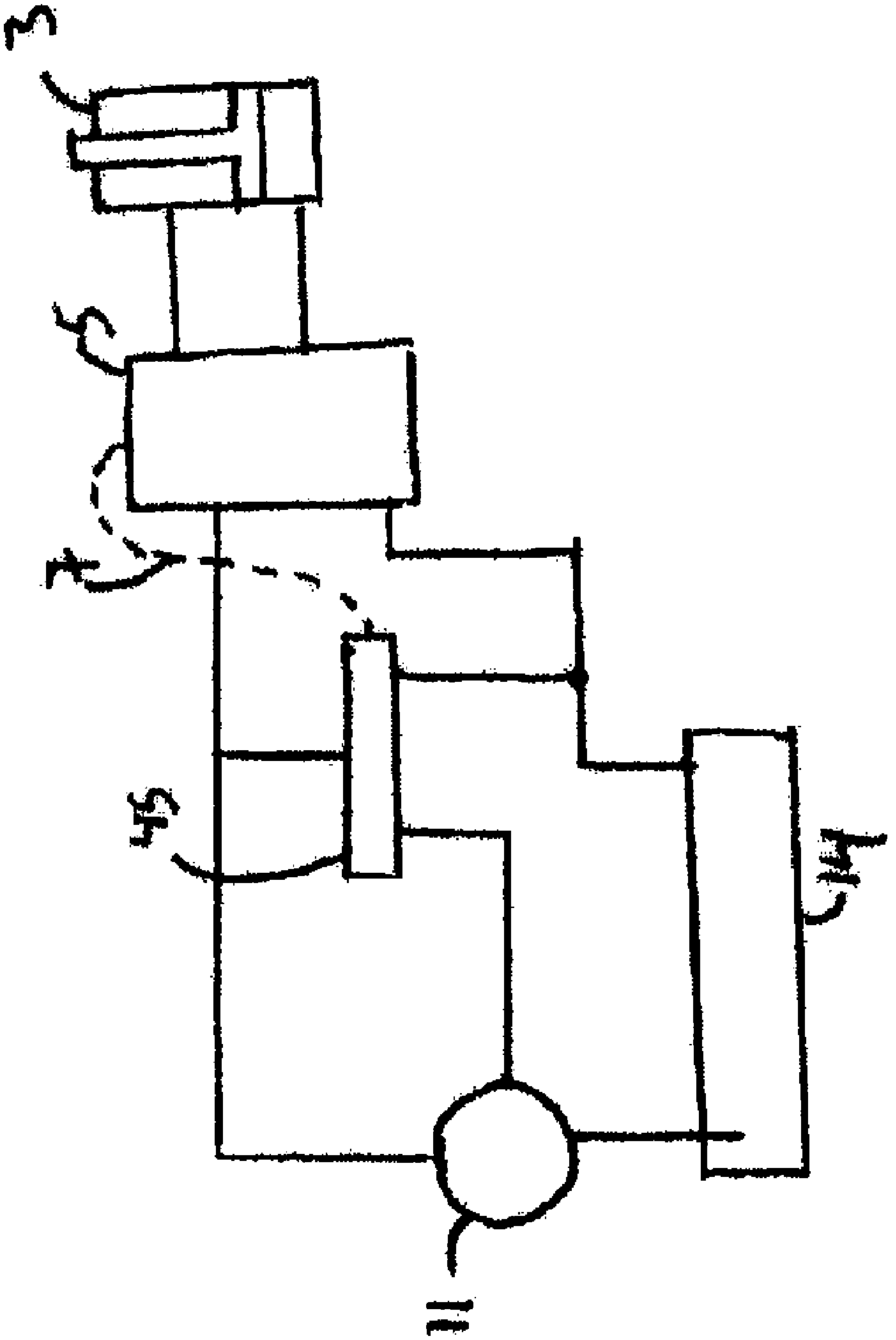
FIG. 1 shows a schematic drawing illustrating one embodiment of the present invention.

FIG. 1 shows a schematic according to one illustrative embodiment of the current invention. A load sensing variable displacement pump 11, pumps hydraulic fluid from a reservoir 14 to a stroke valve 45 and a hydraulic function valve 5. Port T of the stroke valve 45 is connected to the reservoir, port P of the stroke valve 45 is connected to either the function valve input or output port, and the working port of the stroke valve 45 is connected to the load sensing input port of the pump. The stroke valve 45 may be a 3 way 2 position valve. The function valve 5 controls the flow of hydraulic fluid to and from a hydraulic function 3, and may be any suitable type of closed center valve. The hydraulic function 3 may be any suitable function controlled or operated by the flow of hydraulic fluid such as a hydraulic piston, a hydraulic motor, a hydraulic driven compressor, etc. A interconnector 7, brings the function valve 5 and the stroke valve 45 into communication, such that when the function valve 5 is operated the stroke valve 45 is also operated. If the stroke valve 45 is a solenoid on/off valve the interconnector 7 may be an electrical signal provided by the function valve 5. If the function valve 5 is controlled electrically, the signal to the interconnector 7 may be the same as the electrical signal to the function valve 5. If the function valve 5 is not controlled electrically, the controller of the function valve 5 may be readily adapted to provide an electrical signal to the interconnector 7 whenever the function valve is operated. If the stroke valve is of a type other then a solenoid on/off valve, the interconnector 7 may be suitably adapted to operate the stroke valve 45 when required. This may include a mechanical linkage, pilot pressure signals, pneumatic control, etc.

When the function valve 5 is operated to allow hydraulic fluid to flow through the valve to the hydraulic function 3, the stroke valve 45 is also operated to connect the P port of the stroke valve 45 to the working port of the stroke valve 45. As a result the pump 11 receives a load sensing signal from the stroke valve 45 and controls the flow of hydraulic fluid to the function valve 5.

Although described as controlling only a single hydraulic function 3, the function valve 5 may comprise multiple function valves controlling different hydraulic functions as set out below.

Through the use of the stroke valve 45 in the configuration as described, non-load sensing valves may be used in conjunction with a load sensing pump.

The hydraulic system as described may be used advantageously in numerous applications. One application that benefits from the described hydraulic system is the hydraulic system of a vehicle, which has a substantially continuous hydraulic function as well as on-demand hydraulic functions, such as a vehicle used for plowing and sanding roads. The sander of the vehicle runs substantially continuously, as such an economic benefit may be achieved through the use of a load sensing variable displacement pump. By using the hydraulic system of the current invention, the same pump may be used to control other hydraulic functions of the vehicle, such as raising and lowering of the plow. This is achieved using non-load sensing closed center valves.

Figure 2:
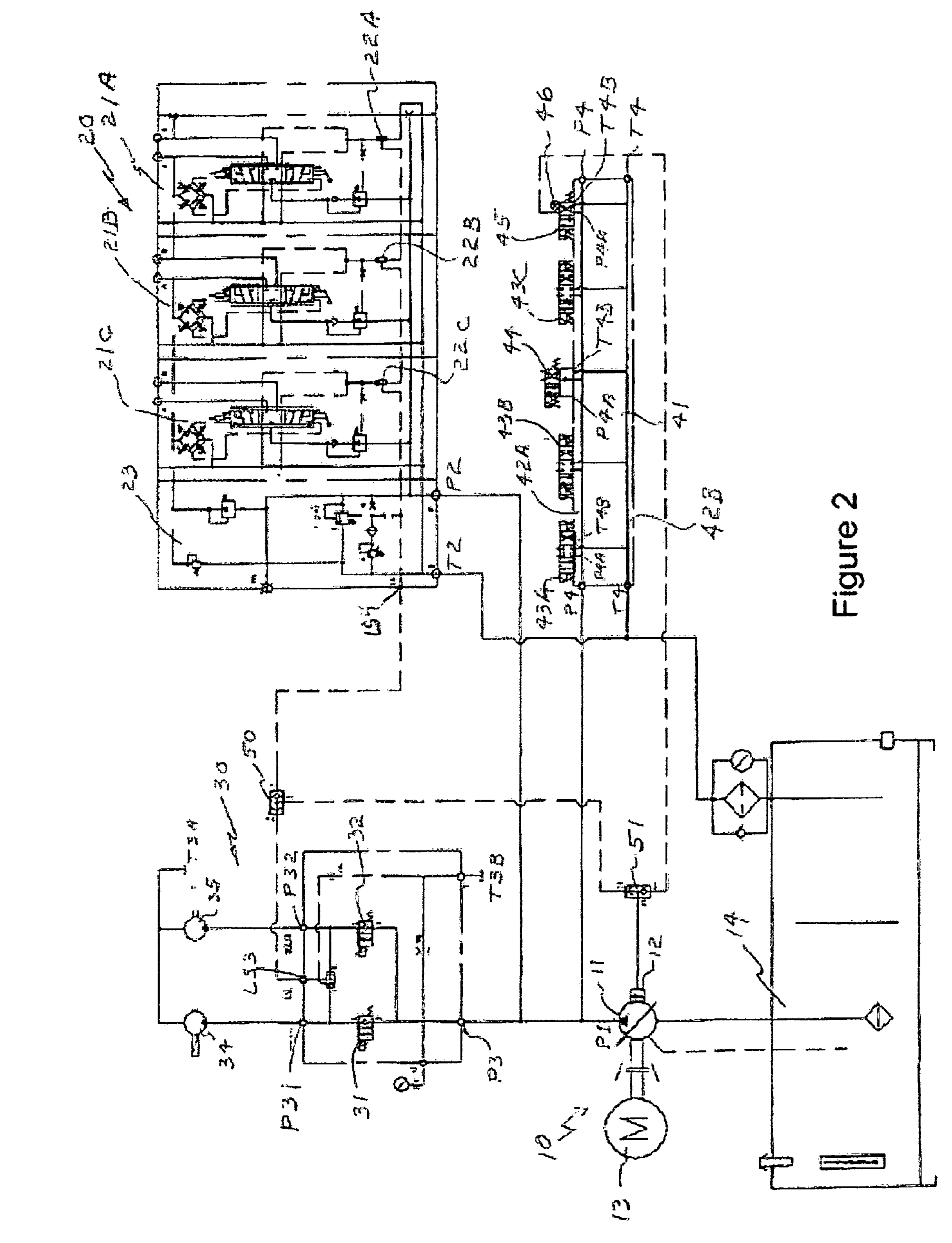
FIG. 2 shows a hydraulic schematic drawing illustration another embodiment of the present invention.

FIG. 2 shows a hydraulic schematic of a first illustrative embodiment of the current invention. The embodiment is directed to a hydraulic system for operating plow/spreader type equipment. The plow/spreader embodiment has a valve apparatus or block for controlling the spreader equipment. The spreader valve apparatus comprises load sensing valves, and the spreader valve apparatus provides a load sensing signal to control the pump. A load sensing apparatus, for example a load sensing valve stack, comprises load sensing valves to control various functions. The load sensing apparatus also provides a load sensing pressure signal to control the pump. An on/off valve apparatus, such as a manifold valve stack comprises non-load sensing on-off valves to control various plow functions. The on/off valve apparatus comprises a stroke valve for providing a load sensing pressure signal to control the pump.

A shuttle valve arrangement is connected to the load sensing pressure signals and provides the highest pressure signal to the load sensing pressure port of the load sensing pump to control the fluid flow of the pump.

The plow/spreader hydraulic system in accordance with the present embodiment is illustrated in FIG. 2. A pumping unit 10 includes a load sensing variable displacement pump 11 having a load sensing pressure port 12. The pump 11, which is driven either directly off of a motor 13, such as a truck engine or off of an automatic transmission via a power take-off, pumps hydraulic fluid or oil from a reservoir 14 out of a port P1. The pressure detected at the sensing pressure port 12 controls the fluid flow from the pump 11 in order to maintain the desired pressure differential. Pumps of this type are readily available in the market, one example of such a pump is manufactured by Parker as model number PAVC65RH.

The hydraulic circuit includes fluid lines that connect the pump return pressure port P1 to pressure ports P2, P3 and P4 of three groups of valves, a load sensing valve stack 20, a load sensing spreader valve 30 and a manifold valve stack 40. The circuit further includes fluid lines that connect the return ports of the load sensing valve stack 20 (T2) and the manifold valve stack 40 (T4) to reservoir 14. Spreader valve 30 must have a drain port T3B if the valve 30 incorporates a bleed-off line in order to prevent trapped oil in the LS signal line from maintaining pressure when the valve is off (de-energised). This ensures that stand-by pressure is as low as possible when the spreader is not used.

The load sensing valve stack 20 is used to operate the plow equipment that requires proportional control such as for example a wing front post lift, a side wing lift, the truck box hoist. What functions are controlled proportionally and which ones are on-off may be determined based on the user's preference and/or budget and/or requirement. Typical functions found on plow sander trucks are: wing front post lift, wing rear lift, reversible front plow, variable pitch front plow, front plow lift, banking tower, under body scraper lift, under body left-right orientation, quick hitch lock-unlock, roll-on-roll-off winch, roll-on-roll-off locking pins, detachable harness tilt, dump body hoist, inside lift for side dump four season bodies, and the like. Usually not all the above listed functions are present on given equipment. Any function that is not controlled proportionally will be controlled on/off, which is much less expensive. The stack 20 includes a number of load sensing valve units 21A, 21B, 21C, three being shown, one for each component of the equipment to be operated proportionally. These valves may be controlled electrically, mechanically or by any other manner. The valve units 21A, 21B, 21C include shuttle valves 22A, 22B, 22C which are connected in series to provide the highest pressure detected at the valves 21A, 21B, 21C to the stack 20 LS4 port. The LS4 port is connected to a shuttle valve 50. Valve stack 20 further includes a pressure section 23 having a relief valve 24. The pump feeds fluid to the valve stack 20 through pressure port P2 and the fluid is returned to the reservoir 14 from return port T2.

For certain applications where valves of different capacity are required, the valve stack 20 may be divided into different sections, wherein the valves in each respective section are of the same capacity. Note that for valves of a given model there may exist spools of different maximum flows that allow precise speed control for various functions. In certain applications, it may be determined that few if any components of a selected piece of plow/spreader equipment actually require proportional control. Since the valve stack 20 only includes load sensing proportional valves, the valve stack 20 would not be required if the plow equipment does not need proportional control. An example of the valve 21A, 21B, 21C that may be used with the present invention is the Danfoss PVG 32 valve or the Walvoil DLS8 valve.

The load sensing spreader valve 30 is shown as having a first and a second branch with metering devices 31 and 32. Metering devices 31 and 32 may be proportionally controlled valves. Metering device 31 controls fluid flow to a motor 34 for a material transporting device such as a conveyor, an auger or a combination of both, through return port P51, while metering device 32 controls fluid flow to a spinner motor through return port P32. Valve 30 further includes a shuttle valve 33 such that the highest pressure at the outlets of the metering devices 31 and 32 is transferred through a load sensing port LS3 to the shuttle valve 50, which transfers the highest pressure signal it detects to a further shuttle valve 51. Though spreader valve 30 has been shown as having two branches, it may have further branches. For instance, a third branch may be used to control a liquid dispenser.

Examples of spreader valves 30 that do not have a bleed-off by-pass line are the Vickers ICSV3000, and the Danfoss 2FFC12 or FFLC12 valves. Valves without internal bleed-off require the addition of an external drain in order to prevent any residual pressure in the LS signal line when the sander valve is turned off. Examples of spreader valves with a by-pass line incorporated in the design of the spreader valve itself are the 800 VALACE-2LS or in the 800 VALACE-3LS.

The manifold valve stack 40 operates the plow equipment that requires on/off control. The manifold 40 includes a mounting block 41 having an pressure port P4 and a return port T4 at each end of the mounting block 41 that are connected to a pair of separate channels 42A and 42B are located within the mounting block 41 along its length. As only one pressure port P4 and return port T4 are connected, the other one must be plugged. Openings to the surface of the mounting block from the channels 42A and 42B form a series of pressure and return ports P4A and T4B. The required number of ports P4A and T4B will depend on the number of components in the plow equipment to be operated by the manifold valve stack 40 in any particular application, and may number up to 12 per manifold. Closed center valves are mounted onto the mounting block 41 and connect to their respective ports P4A and T4B. For most components in the plow equipment, 4 way 3 position valves 43A, 43B, 43C may be used, however for some functions 4 way 2 position valves 44 will suffice. In this particular embodiment, the components operated by the manifold valve stack 40 may be the front plow lift, the front plow left-right orientation, the detachable harness using 4 way 3 position valves 43A, 43B, 43C and the quick hitch lock using a 4 way 2 position valve 44.

It is to be noted that none of the valves 43A, 43B, 43C or 44, which may be of the Denison A4D01 model, or Hystar DSG01 model, are load sensing valves. Instead, a stroke valve 45, which is a 4 way 2 position closed centre valve, is also located on the mounting block 41, and is controlled so as to receive a signal to open at the same time as any one of the other valves 43A, 43B, 43C or 44. When valve 45 is operated, it sends a pressure signal to the shuttle valve 51, which also receives a pressure signal from shuttle valve 50 to provide a pressure signal to the pump 11 through the load sensing pressure port 12. In this way, the pump receives a pressure signal increase whenever any one or more of the components of the plow/spreader equipment are operated.

The valve size CETOP03 is suggested for this application as shown in the sample models given, due to its low cost, adequate flow capacity, ready availability and the possibility to meet special requirements by adding sandwiches with various auxiliary valves such as counterbalance or reliefs. Other valve sizes may be used using the same concept of the stroke valve.

Though the system has been described as having one manifold 41, further valve manifolds may be incorporated into the system, however only one of the manifolds 41 needs to have a stroke valve 45.

All of the valves 43A, 43B, 43C, 44 and 45 are of the “closed center” configuration, which means that in their neutral position there is no oil flow going through the valve. In its neutral position, the stroke valve 45 fluidly connects P4A to working port B, and working port A to T4B. In order to block any flow with the stroke valve 45 in neutral, a plug 46 is installed in the B port.

In operation, through its load sensing pressure port 12, pump 11 senses pressure changes whenever spreader valve 30 and/or a valve 21A, 21B, 21C in the valve stack 20 is operated under the control of the vehicle operator who applies a signal to the respective valve either electrically, mechanically or by some other manner determined by the system. In the manifold valve stack 40, when a signal is sent to any one of the operating valves 43A, 43B, 43C, 44 of the manifold 41, a signal is simultaneously sent to the stroke valve 45; this signal causes the spool in the valve 45 to shift, connecting the P4A port to A. With the A port of valve 45 connected to the shuttle valve 51, and the load sensing lines of the plow valve stack 20 and the spreader valves 30 connected to the shuttle valve 50, which in turn is also connected to shuttle valve 51, the highest load sensing pressure of all of the valves is connected to the pump load sensing pressure port 12. This will cause the pump 11 to stroke until it reaches its pressure compensator setting, which is the maximum system pressure.

The stroke valve 45 is energized every time one of the other manifold valves 43A, 43B, 43C, 44 is energized to operate a plow function. This can be accomplished by using a solenoid to control the valve. The controls of the manifold valves 43A, 43B, 43C and 44 may be modified to send a signal to the solenoid whenever they are operated. Every time a work port is opened to operate a plow equipment component, such as the wing banking cylinder, the stroke valve 45 causes the pump pressure to increase to the pump compensator setting. If, for example, 500 psi is required to extend the front plow lift cylinder and the pump 11 compensator is adjusted to, for example 2000 psi, the front plow lift cylinder speed can be very accurately adjusted by choosing an orifice size. The plow weight requires a certain pressure in order to raise it, for example 500 psi. Knowing that there is 2000 psi on the valve side of the orifice and that 500 psi is required to get the cylinder to move, there exists a pressure drop of 1500 psi every time the system is operated. A constant pressure drop of 1500 psi across a given orifice size results in a constant flow rate, which when properly selected gives good speed control. It should be noted that the figures given in this example were for the front plow raise function. When the plow is powered down, there is speed control for the same reason: The weight adds to the hydraulic pressure, but as the rod end of the cylinder is pushed, induced pressure on the piston side is lower than system pressure, but with the help of the plow weight almost identical speed in both directions is obtained.

The spreader valve 30 and the plow valve stack 20 can be affected by the action of the stroke valve 46 if they are not pressure compensated. If the valves are pressure compensated, the pressure compensator eliminates the various pressure differentials and maintains constant flow. Non-compensated valves will show an increase in oil flow. As the plow valve is controlled by the operator, the operator may adjust the functions speed to his liking. With a closed loop spreader control system, the electronics will compensate for any valve variations.

The versatility of the load sensing hydraulic system in accordance with the present invention is clearly evident. As many equipment components as desired may be added to the vehicle and operated by adding valves to the hydraulic system. As long as the pump 11 has enough flow capacity to supply all actuated components with oil to maintain stand-by pressure all components will work simultaneously at their predetermined speed. If oil flow drops below demand, the lowest pressure requirements will be met first. In practical use the operator will likely never be able to use more than a maximum of three functions simultaneously due to the layout of the controls and the size of the operator's hand. Manifold valve stacks 41 may be added as required by simply plugging P and T ports into Tees. Because the stroke valve 45 is activated every time any other functional on/off valve is activated, the system permits the possibility of adding an unlimited number of non-load sensing valves to the system.

Figure 3:
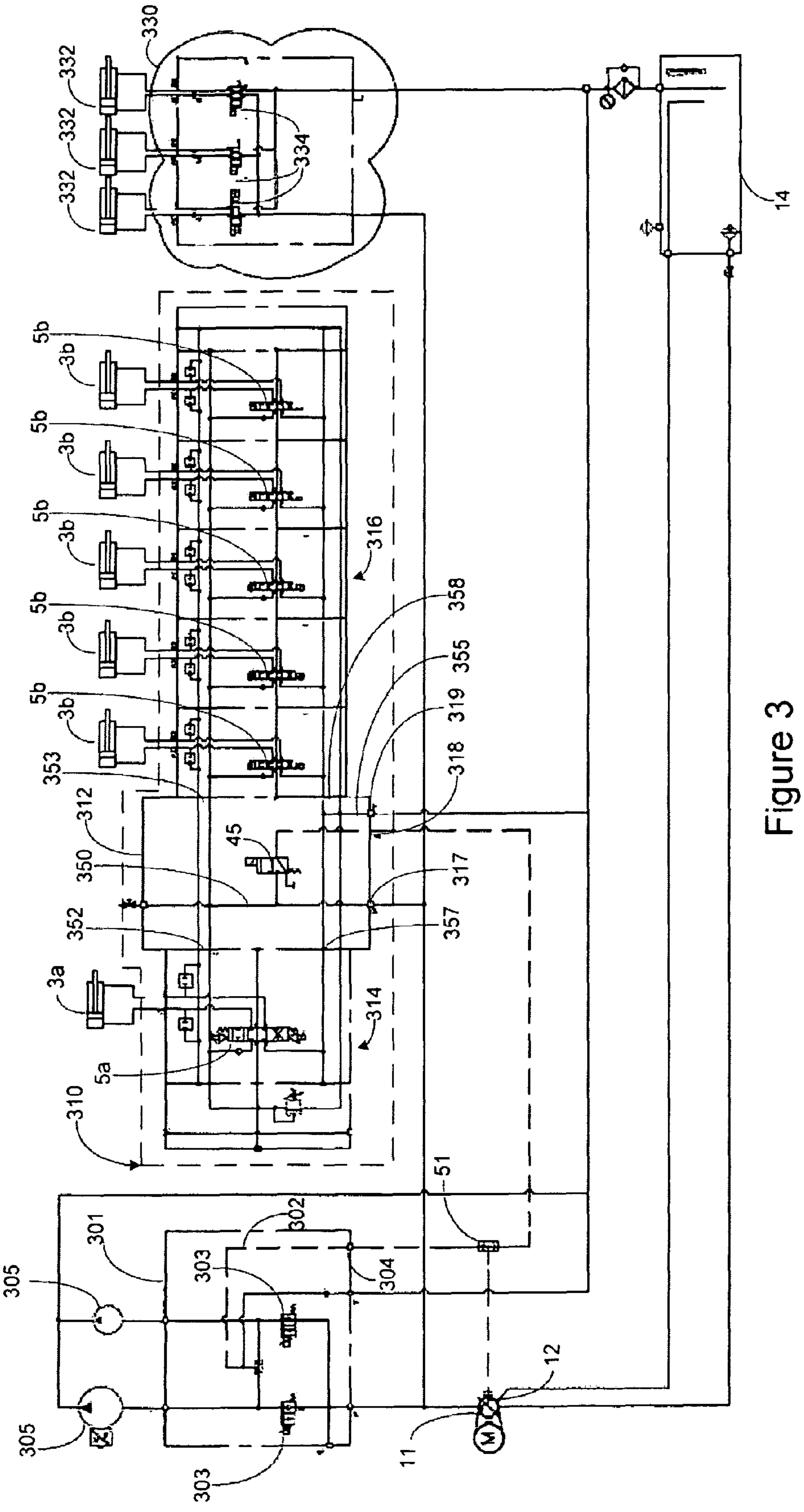
FIG. 3 shows a hydraulic schematic drawing illustration another embodiment of the present invention.

FIG. 3 illustrates a hydraulic schematic according to another embodiment of the present invention. The embodiment provides for the ability to utilize both high and low-flow non-load sensing valve blocks with a load sensing variable displacement pump.

The hydraulic system has a load sensitive variable displacement pump 11, a reservoir 14, a load sensitive valve block 301, a unitised valve block 310, a remote manifold 330 and a shuttle valve 51.

The load sensitive valve block 301 is connected to the pump 11 and the reservoir 14 and includes a load sensitive valve 303 to control a hydraulic function 305. The load sensitive block 301 provides a load signal 302 as is well known in the art. The load sensitive valve block 301 is also connected to the reservoir 14 through a bleed off orifice for bleeding off hydraulic fluid trapped in the load signal channel when the load sensitive valve is not operating. The load sensitive valve block 301 may comprise more than one load sensitive valve 303, however, usually comprises at least two load sensitive valves. Each load sensitive valve 303 controls a hydraulic function 305.

The unitised valve block 310 includes an adapter block 312 connected to a first valve block and a second valve block. In the present embodiment the first valve block is a high-flow valve block 314 and the second valve block is a low- flow valve block 316. The first and second valve blocks need not be different. For example two low flow valve blocks may be connected to the adapter block. Furthermore only one valve block may be connected to the adapter block.

The stroke valve 45 is located within the adapter block 312. The function and operation of the stroke valve 45 is the same as previously described. When a function valve 5*a*, 5*b* of either the high or low-flow valve block 314, 316 is operated the stroke valve 45 is operated. When in operation the stroke valve 45 connects an input line of the adapter block, which is connected to the P port of the stroke valve, to a load signal port 318 of the adapter block 312, which is connected to the working port of the stroke valve 45. The load signal port 318 provides a load signal for controlling the load sensitive pump 11. When not in operation, the stroke valve 45 connects the load signal port 318 to the reservoir 14 through the T port of the stroke valve. A bleed off orifice is not required since the stroke valve T port is separated from the pressure port. This releases any trapped hydraulic fluid in the load signal line when the stroke valve is not operated.

In the present embodiment the adapter block 312 has a pressure port 317, a return port 319 and a load signal port 318. The pressure port 317 is connected to the output from the pump 11. The return port 319 is connected to the reservoir 14. The load signal port 318 is connected to the load signal port 12 of the pump 11. The load signal port 318 may be connected directly to the pump 11 if there is only one load signal line in the hydraulic system. If there is more than one load signal line, such as when a load sensitive valve block 301 is incorporated, a shuttle valve 51 is used to connect the load signal line with the highest pressure to the load signal port 12 of the pump as set out below.

In the current embodiment comprising both the unitised valve block 310 and the load sensitive valve block 301, a shuttle valve 51 must be used to connect the load signal line with the highest pressure to the load signal port 12 of the pump 11. One input of the shuttle valve 51 is connected to the load signal port 304 of the load sensitive valve block 301 and the other input of the shuttle valve 51 is connected to the load signal port 318 of the unitised valve block 310. The output of the shuttle valve 51 is connected to the load signal port 12 of the pump 11. Multiple shuttle valves may be required depending on the number of pressure signals present in the hydraulic system.

The hydraulic system may also include one or more remote manifolds 330 for operating other hydraulic functions 332. The remote manifold 330 may contain any number of remote function valves 334 for controlling hydraulic functions 332. The remote manifold 330 does not require a separate stroke valve. When operated, the remote function valves 334 provide a signal (not shown) to the stroke valve 45 of the adapter block 312 so that the stroke valve 45 is operated as well.

The adapter block 312 has pressure channels 350 formed therein to connect the input port 317 of the adapter block 312 to the P ports of the connected high- and low-flow valve blocks 352, 353 respectively. Separate outlet channels 355 are formed in the adapter block 312 connecting the T ports of the connected high and low-flow valve blocks 357, 358 respectively to the return port 319 of the adapter block 312.

The high-flow valve block 314 may be comprise one or more SD16 sandwich valves manufactured by Walvoil. The outlet cover of the SD16 valve block is replaced with the adapter block 312. The adapter block 312 is manufactured such that the pressure 350 and outlet 355 channels of the adapter block 312 are in fluid communication with the P and T ports of the SD16 when it is secured to the adapter block 312.

The low-flow valve block 316 may be one or more SD100 sandwich valves manufactured by Walvoil. The outlet cover of the SD100 is also replaced with the adapter block 312. The adapter block 312 is manufactured such that the pressure 350 and outlet 355 channels of the adapter block 312 are in fluid communication with the P and T ports of the SD100 as well when it is secured to the adapter block.

Replacing the outlet covers of the SD16 and SD100 valve blocks has the advantage of maintaining the original inlet covers. The pressure cover of the SD16 has the option of providing a full flow main relief valve that may be used in conjunction with the current hydraulic system. The pressure cover of the SD100 can be provided with a pressure reducing cover to provide pilot pressure necessary when using electro-proportional controls. By retaining the inlet sections of the SD16 and SD100, a number of different types of function control devices may be included in the valve block. These may include: manual, pneumatic proportional, electric on-off and electro-proportional devices.

Although the outlet covers of both the SD16 and the SD100 have been described as being replaced with the adapter block, one skilled in the art will realize that the inlet covers of either the SD16 or the SD100 could be replaced with the adapter block 312 instead of the outlet cover.

The stroke valve 45 has been described as a 3 way 2 position solenoid valve when installed in an adapter block. It is to be understood that other types of controls are possible, such as a mechanical linkage, pilot pressure control, pneumatic control, etc., for operating the stroke valve. Furthermore, the 3 way valve may be replaced with a 4 way valve that has a work port plugged. The function valves 303, 5*a*, 5*b*, 334 of the various blocks 301, 310, 330 are closed center valves.

Figure 4:
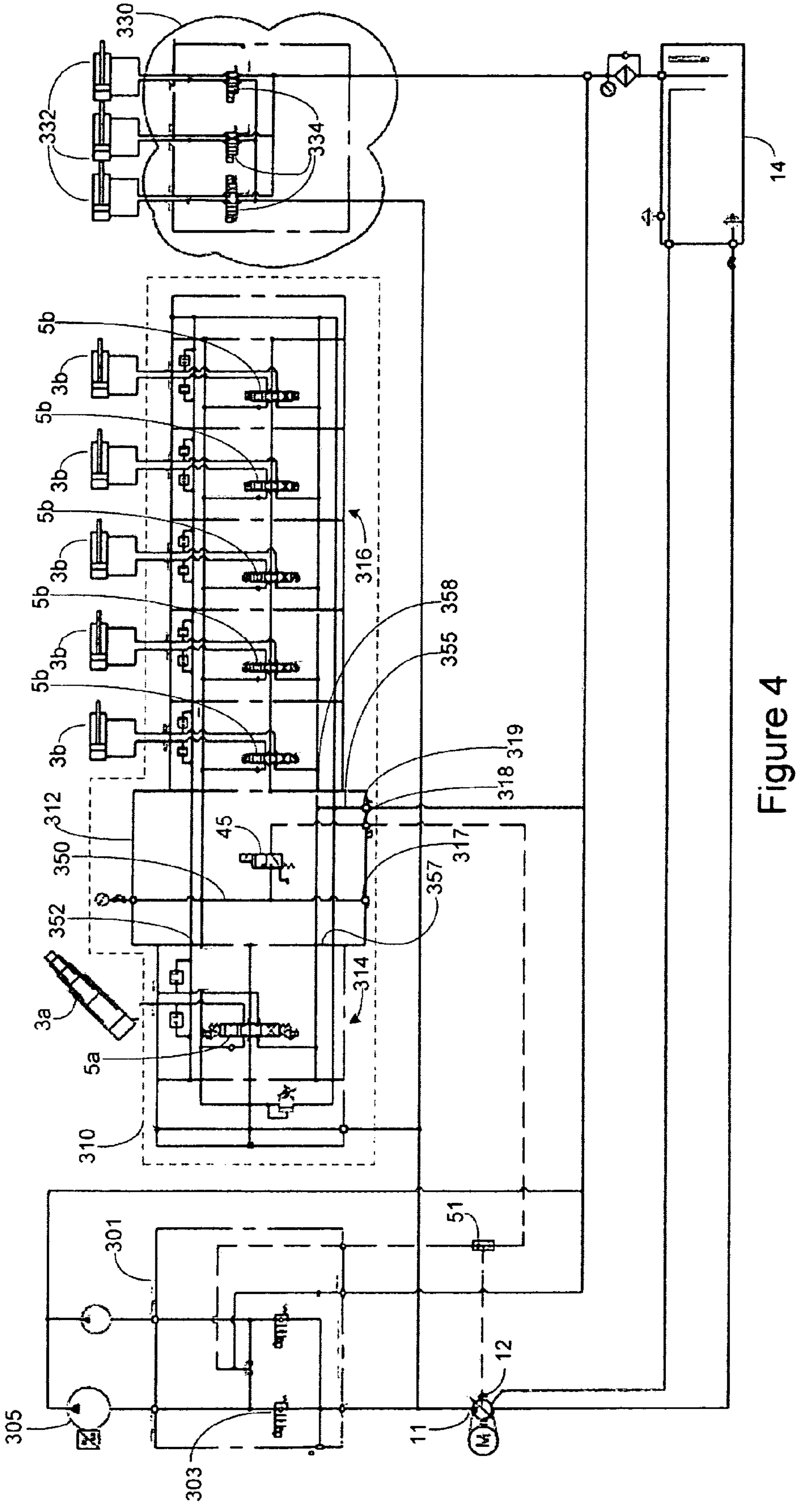
FIG. 4 shows a hydraulic schematic drawing illustration another embodiment of the present invention.

Although the pump 11 is described as being connected to the adapter block 312 it may be connected to the pressure cover of the SD16 as shown in FIG. 4, which illustrates an alternate embodiment provided by the present invention. This configuration may be desirable depending on the plumbing and space limitations for a particular installation.

Figure 5:
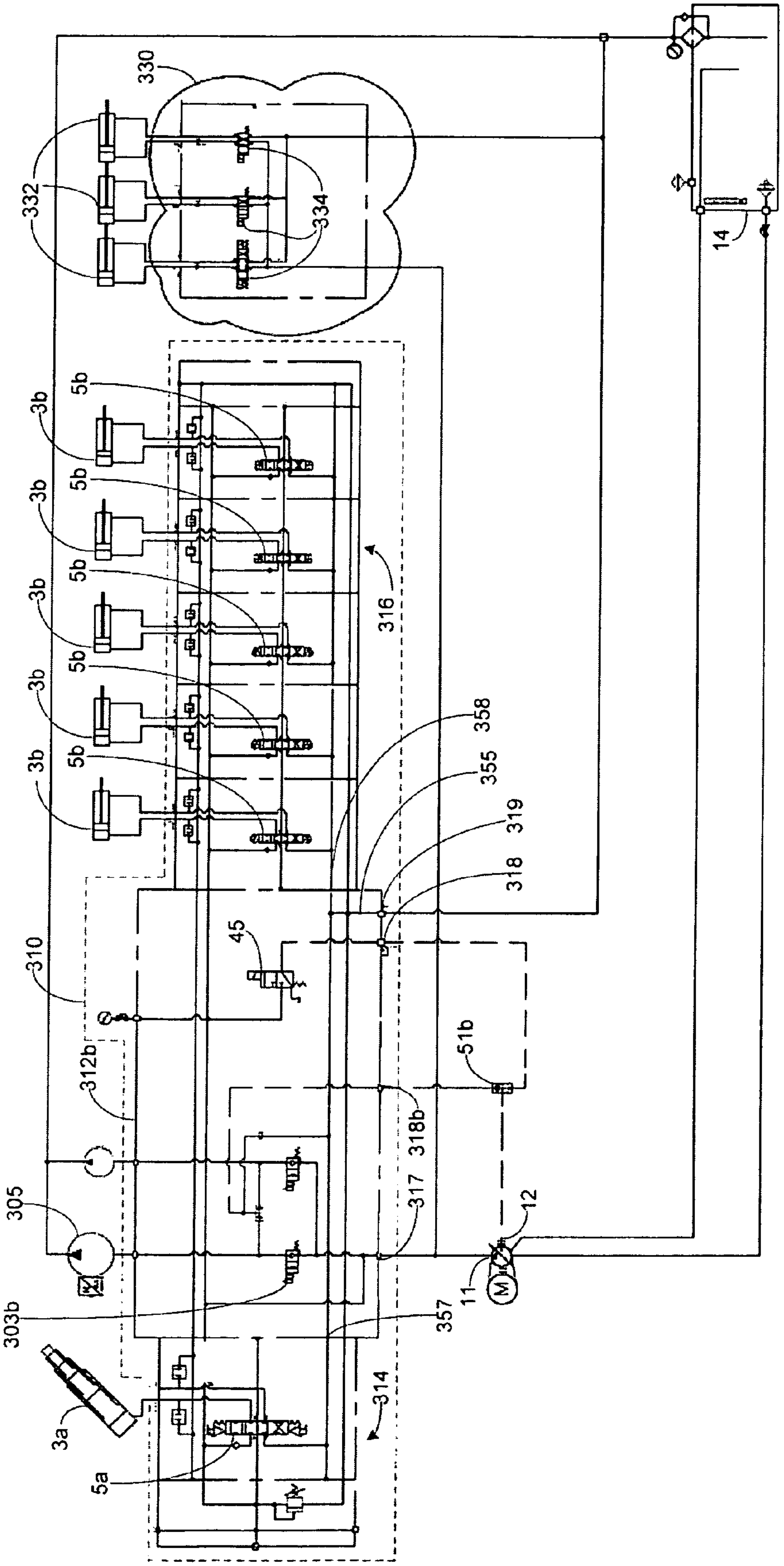
FIG. 5 shows a hydraulic schematic drawing illustration another embodiment of the present invention.

FIG. 5 shows another alternate embodiment of the present invention wherein the adapter block 312*b* contains the load sensitive function valve 303*b* to control the hydraulic function 305. Those skilled in the art will realize that more than one load sensitive function valve 303*b* may be included in the adapter block 312*b*. An adapter block 312*b* containing a load sensitive function valve 303*b*may reduce the plumbing requirements necessary for a particular installation. If the load sensitive valves 303*b* are incorporated into the adapter block 312*b*shuttle valve may also be included in the adapter block 312*b* to provide the highest pressure signal between the stroke valve 45 and the load sensitive valves 303*b* to the load signal port 12 of the pump 11. At least one shuttle valve must be used in order to make sure the load sensing pump receives a load sensing pressure signal. If the adapter block 312*b* is not provided with a shuttle valve, an additional load signal return port 318*b* may be provided for the pressure signal from the load sensing valves. A shuttle valve 51*b* may then be provided remotely from the adapter block for providing the highest pressure signal to the load sensing pressure of the pump.

The hydraulic system as described above may advantageously be used to control the flow of hydraulic fluid to other hydraulic functions, such as for example a street sweeper. Depending on the hydraulic flow requirements there are various possibilities: If the sweeper broom requires flow within the flow capacities of the sander valve 301 the flow if the sander valve may be used. When higher flow is required, an unused port of the high flow valve 5*a* may be used. This would activate the stroke valve for flow. If the low flow block meets the flow requirements, it may be used for the control of the sweeper. For an application having unidirectional flow an extra high flow section 5*a* may be added, and a load sense signal derived from its used work port. This signal may be used to stroke the pump through an additional shuttle valve 51 in order to maintain a constant pressure differential across the work spool. Similar set-ups may be used for the use of an auger, a hydraulic hammer, various street cleaning attachments and a variety of other implements.

The benefits of using a load sensitive variable displacement pump are well known in the art. By using the stroke valve 45 as described herein, non-load sensing function valves may be used in place of more expensive load sensing valves, while maintaining the benefits of the load sensitive variable displacement pump.

While the invention has been described according to what is presently considered to be the most practical and illustrative embodiments, it must be understood that the invention is not limited to the disclosed embodiments. Those ordinarily skilled in the art will understand that various modifications and equivalent structures and functions may be made without departing from the spirit and scope of the invention as defined in the claims.

I claim:

1. A hydraulic system for operating hydraulic functions of plow/spreader type equipment comprising:

a) a reservoir means for hydraulic fluid;

b) a load sensitive variable displacement pump means for pumping hydraulic fluid from the reservoir; and c) a plow on/off valve means having a pressure port coupled to the pump means for receiving hydraulic fluid under pressure, the plow valve means including:

i) a manifold means having a fluid channel coupled to the plow valve means pressure port and further having a number of return ports;

ii) one or more on/off valve means coupled to the manifold means return ports, each valve means being adapted to control fluid flow therein to operate a respective component of the plow equipment; and iii) a stroke valve means coupled to a manifold means return port, the stroke valve means being adapted to operate in conjunction with one or more of the on/off valve means for providing a load sensing pressure signal to the pump means.

2. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal; and e) a shuttle valve means for receiving the load sensing pressure signal from the spreader valve means and the load sensing pressure signal from plow on/off valve means, and applying a resultant load sensing pressure signal to the pump means.

3. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal;

e) a shuttle valve means for receiving the load sensing pressure signal from the spreader valve means and the load sensing pressure signal from plow on/off valve means, and applying a resultant load sensing pressure signal to the pump means; and f) a plow load sensing valve means having a pressure port coupled to the pump means for receiving hydraulic fluid under pressure, the plow load sensing valve means including:

i) one or more load sensing valve means adapted to control fluid flow therein to operate a respective component of the plow equipment; and ii) a port means for providing a load sensing pressure signal from the plow load sensing valve means.

4. The hydraulic system of claim 3, wherein the shuttle valve means includes:

i) a first shuttle valve having inputs coupled to the load sensing spreader valve means and to the plow load sensing valve means to provide an output signal; and ii) a second shuttle valve having inputs coupled to the first shuttle valve and to the plow on/off valve means to provide an output to the load sensing pump.

5. The hydraulic system of claim 1, wherein the on/off valve means are closed center valves.

6. The hydraulic system of claim 1, wherein the on/off valve means are closed center valves including 4-way 3-position valves.

7. The hydraulic system of claim 1, wherein the on/off valve means include 4-way 2-position valves.

8. The hydraulic system of claim 1, wherein the stroke valve means is a closed center 4-way 2-position valve.

9. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal; and e) a shuttle valve means for receiving the load sensing pressure signal from the spreader valve means and the load sensing pressure signal from plow on/off valve means, and applying a resultant load sensing pressure signal to the pump means; and wherein the load sensing spreader valve means include proportional control valves.

10. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal; and e) a shuttle valve means for receiving the load sensing pressure signal from the spreader valve means and the load sensing pressure signal from plow on/off valve means, and applying a resultant load sensing pressure signal to the pump means; and wherein the load sensing spreader valve means and the plow on/off valve means include return ports coupled to the reservoir means.

11. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal;

e) a shuttle valve means for receiving the load sensing pressure signal from the spreader valve means and the load sensing pressure signal from plow on/off valve means, and applying a resultant load sensing pressure signal to the pump means; and f) a plow load sensing valve means having a pressure port coupled to the pump means for receiving hydraulic fluid under pressure, the plow load sensing valve means including:

i) one or more load sensing valve means adapted to control fluid flow therein to operate a respective component of the plow equipment; and ii) a port means for providing a load sensing pressure signal from the plow load sensing valve means; and wherein the load sensing spreader valve means, the plow on/off valve means and the plow load sensing valve means include return ports coupled to the reservoir means.

12. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal; and e) a shuttle valve means for receiving the load sensing pressure signal from the spreader valve means and the load sensing pressure signal from plow on/off valve means, and applying a resultant load sensing pressure signal to the pump means; and wherein the load sensing spreader valve means is adapted to operate one or more of the spreader equipment components selected from the group consisting of a conveyor, an auger, a spinner and a liquid dispensing device.

13. The hydraulic system of claim 1, wherein the plow sensing on/off valve means is adapted to operate one or more of the plow equipment components selected from the group consisting of a front plow lift, a front plow left-right orientation, a detachable harness and a quick hitch lock.

14. The hydraulic system of claim 1, further comprising:

d) a load sensing spreader valve means having a pressure port coupled to the pump means for receiving hydraulic fluid under pressure, the spreader valve means including:

i) means for controlling fluid flow through the spreader valve for operating the spreader; and ii) port means for providing a load sensing pressure signal; and e) a shuttle valve means for receiving the load sensing pressure signal from the spreader valve means and the load sensing pressure signal from plow on/off valve means, and applying a resultant load sensing pressure signal to the pump means; and wherein the plow load sensing valve means is adapted to operate one or more of the plow equipment components selected from the group consisting of a wing front post lift, a wing rear lift, a reversible front plow, a variable pitch front plow, a front plow lift, a banking tower, an under body scraper lift, an under body left-right orientation, a quick hitch lock-unlock, a roll-on-roll-off winch, roll-on-roll-off locking pins, a detachable harness tilt, a dump body hoist and an inside lift for side dump four season bodies.

15. A hydraulic system for controlling hydraulic functions comprising:

a) a reservoir means for hydraulic fluid;

b) a load sensing variable displacement pump means for pumping hydraulic fluid from the reservoir;

c) a unitised valve block having a pressure port coupled to the pump means, the unitised valve block comprising at least one hydraulic function valve means for controlling at least one hydraulic function; and d) a stroke valve means for providing a load sensing pressure signal to the pump means, the stroke valve being operated based on the operation of each function valve means.

16. The hydraulic system of claim 15, wherein the unitized valve block further comprises:

i) an adapter block comprising the stroke valve;

ii) a first valve block comprising at least one first function valve connected to the valve block pressure port for controlling at least one first hydraulic function; and iii) a second valve block comprising at least one second function valve connected to the valve block pressure port for controlling at least one second hydraulic function, wherein the first valve block is connected to a first location of the adapter block, and the second valve block is connected to a second location of the adapter block.

17. The hydraulic system of claim 16, wherein the first valve block is a high-flow valve block comprising a high-flow pressure channel and a high-flow outlet channel, the at least one first function valve is a high-flow function valve, the at least one first hydraulic function is a high-flow hydraulic function, and the first location of the adapter lock is a high-flow location of the adapter block; and wherein the second valve block is a low-flow valve block comprising a low-flow pressure channel and a low-flow outlet channel, the at least one second function valve is a low-flow function valve, the at least one second hydraulic function is a low-flow hydraulic function, and the second location of the adapter block is a low-flow location of the adapter block.

18. The hydraulic system of claim 17, wherein the adapter block further comprises:

i) a pressure channel in fluid communication with:

an adapter block pressure port;

an adapter block high-flow pressure port in fluid communication with the high-flow pressure channel of the high-flow valve block;

an adapter block low-flow pressure port in fluid communication with the low-flow pressure channel; and the stroke valve;

ii) an outlet channel in fluid communication with:

an adapter block return port;

an adapter block high-flow return port in fluid communication with the high-flow outlet channel of the high-flow valve block;

an adapter block low-flow return port in fluid communication with the low-flow outlet channel of the low-flow valve block; and the stroke valve; and iii) a load sensing pressure signal channel in fluid communication with:

an adapter block load sensing pressure signal port; and the stroke valve.

19. The hydraulic system of claim 18, wherein the stroke valve couples the adapter block input channel to the load sensing pressure signal channel based on the operation of each of the high-flow function valves and each of the low-flow function valves, such that each time any of the at least one high-flow function valves or the at least one low-flow function valves is operated the stroke valve is operated.

20. The hydraulic system of claim 17, wherein the high-flow valve block comprises a pressure section having a high-flow pressure port, and wherein the high-flow pressure port is the valve block pressure port.

21. The hydraulic system of claim 15, wherein the hydraulic system further comprises a load sensing valve block comprising:

i) a pressure port coupled to the pump; a load sensing pressure signal port coupled to a shuttle valve first input; and ii) at least one load sensing function valve for controlling at least one hydraulic function and providing a load sensing pressure signal to the load sensing pressure signal port;

wherein the stroke valve means is coupled to a second input of the shuttle valve, the output of the shuttle valve providing a signal for control of the load sensing variable displacement pump.

22. The hydraulic system of claim 21, wherein the load sensing valve block is incorporated into the adapter block.

23. The hydraulic system of claim 21, wherein at least one load sensing function valve controls a continuously operated hydraulic function.

24. The hydraulic system of claim 23, wherein the continuously operated hydraulic function is selected from a sander/spreader, sweeper, street washing device including a water pump, and vacuum equipment.

25. The hydraulic system of claim 15, further comprising at least one remote manifold located remotely from the valve block comprising at least one remote function valve for controlling a remote hydraulic function, the stroke valve being further operated based on the operation of each remote function valve.

26. The hydraulic system of claim 15, wherein the function valve means are closed center non-load sensing valves.

27. The hydraulic system of claim 15, wherein the function valve means include 4-way 3-position valves.

28. The hydraulic system of claim 15, wherein the function valve means include 4-way 2-position valves.

29. The hydraulic system of claim 15, wherein the function valve means include 3-way 3-position valves.

30. The hydraulic system of claim 15, wherein the function valve means include 3-way 2-position valves.

* * * * *